United States Patent [19]
Rosati

[11] 3,891,627
[45] June 24, 1975

[54] 6-[ALPHA-(AMIDINOTHI-OACYLAMIDO)ACYLAMIDO]PENICIL-LANIC ACIDS

[75] Inventor: Robert L. Rosati, New London, Conn.

[73] Assignee: Pfizer Inc., New York, N.Y.

[22] Filed: May 18, 1972

[21] Appl. No.: 254,524

[52] U.S. Cl............................ 260/239.1; 424/271
[51] Int. Cl........................................... C07d 99/16
[58] Field of Search................................. 260/239.1

[56] References Cited
UNITED STATES PATENTS

| | | | |
|---|---|---|---|
| 3,481,922 | 12/1969 | Holdrege | 260/239.1 |
| 3,579,501 | 5/1971 | McGregor et al. | 260/239.1 |
| 3,634,405 | 1/1972 | Holdrege | 260/239.1 |
| 3,711,471 | 1/1973 | Kaplan et al. | 260/239.1 |
| 3,741,960 | 6/1973 | Alburn et al. | 260/239.1 |

*Primary Examiner*—Nicholas S. Rizzo
*Attorney, Agent, or Firm*—Connolly and Hutz

[57] ABSTRACT

6-[α-(amidinothioacylamido)acylamido]penicillanic acids, the non-toxic salts and esters thereof are useful as antibacterial agents, therapeutic agents in animals, including man, of particular value against gram-negative bacteria, and as animal feed nutritional supplements.

12 Claims, No Drawings

6-[α-(AMIDINOTHIOACYLAMIDO)ACYLAMIDO]PENICILLANIC ACIDS

BACKGROUND OF THE INVENTION

1. FIELD OF THE INVENTION

This invention relates to novel antibacterial agents; namely, (substituted acyl)derivatives of α-aminoacylpenicillins. More particularly, it is directed to 6-[α-(amidinothioacylamido)acylamido]penicillanic acids, the non-toxic salts and esters thereof, which are especially useful in the treatment of gram-negative infections and, particularly, Pseudomonas infections.

2. DESCRIPTION OF THE PRIOR ART

A large number of 6-(α-aminoacylamido)penicillanic acids wherein the acyl moiety is alkanoyl or substituted alkanoyl wherein the substituent is an aryl, cycloalkyl or heterocyclic group are disclosed in U.S. Pat. Nos., 2,985,648; 3,007,920; 3,140,282; 3,192,198; 3,316,247; 3,485,819; 3,342,677; 3,531,470; 3,538,083; 3,553,201; British Pat. Nos. 873,049; 903,785; 991,586; 1,033,257 and 1,189,990. Further, 6-[α-substituted amino)acylamido]penicillanic acids are described in U.S. Pat. Nos. 3,198,788; 3,248,387; 3,308,023; 3,320,240; 3,325,477; 3,340,252; 3,381,001; 3,433,784; 3,518,253; British Pat. Nos. 891,977; 894,457; 985,688; 1,048,907; 1,051,675; 1,057,697; 1,064,893; 1,066,107; 1,125,339; 1,180,745; 1,210,472, Belgian Pat. No. 593,295 and Japanese Pat. No. 7,116,994. Additionally, 6-(α-ureido acylamido)penicillanic acids are disclosed in U.S. Pat. No. 3,352,851 and German Pat. Nos. 2,054,772 and 2,127,179; 6-(α-guanidinoacylamido)penicillanic acids in U.S. Pat. Nos. 3,454,557 and 3,406,185; and a variety of p-guanidinoaroyl-, p-guanidinomethylaroyl- and p-guanidinoarylalkanoylamidopenicillanic acids are disclosed in U.S. Pat. No. 3,453,265. British Pat. No. 1,061,335 discloses 6-(D-α-hydrazinocarbonylamino-α-phenylacetamido)penicillanic acid, and British Pat. No. 1,053,818 describes esters of 6-(α-oxalamidoacylamido)penicillanic acids.

A wide variety of 6-[α-(3-substituted ureido)acylamido]penicillanic acids and 6-[α-(3-substituted thioureido)acylamido]penicillanic acids are reported in the recent literature. U.S. Pat. Nos. 3,479,339; 3,481,922; Netherlands Pat. Nos. 69,01646; 69,08909; and Japanese Pat. No. 7,112,732 describe such compounds wherein the 3-substituent is a carbamoyl group; the compounds being referred to as 6-[α-(3-allophanamido)acylamido]penicillanic acids. U.S. Pat. Nos. 3,579,501 and 3,579,514 disclose 6-[α-(3-guanylureido)acylamido]-penicillanic acids and 7-[α-(3-guanylureido)acylamido]cephalosporanic acid; respectively, that is, such compounds wherein the 3-substituent is a guanyl moiety. U.S. Pat. No. 3,634,405 describes a series of 6-[α-(3-imidoylureido)-arylacetamido]penicillanic acids. Acyl derivatives of 7-aminocephalosporanic acid in which the acyl group is a 2-(1,4,5,6-tetrahydropyrimidinyl)thioacetyl group or related (substituted amidinothio)acetyl group are described in U.S. Pat. No. 3,499,893; Belgian Pat. No. 758,219 and by Misiek et al., Anti-microbial Agents and Chemotherapy I, 54–66 (1972).

The above described products are active as antibacterial agents against a variety of gram-positive and gram-negative bacteria. However, while they are active in vitro and in vivo via the intraperitoneal route of administration, they are inactive or, at best, poorly active in vivo via the oral route of administration. Additionally, their pharmaco-kinetics, as evidenced by levels of the compound in the blood, are poor.

SUMMARY OF THE INVENTION

There has now been found a novel series of antibacterial agents; namely, 6-[α-(amidinothioacylamido)acylamido]penicillanic acids of the formula

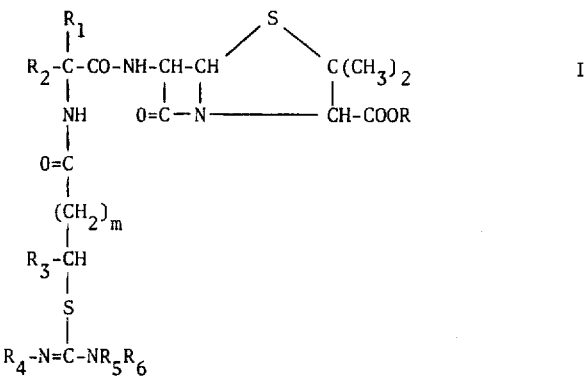

and the pharmaceutically-acceptable metal and amine salts thereof wherein

R is selected from the group consisting of hydrogen and acyloxy lower alkyl wherein acyloxy is selected from the group consisting of lower alkanoyloxy, benzoyloxy and substituted benzoyloxy wherein the substituent is selected from the group consisting of chloro, bromo, fluoro, lower alkyl, lower alkoxy and trifluoromethyl;

$R_1$ is selected from the group consisting of hydrogen, alkyl of 1 to 6 carbon atoms, cycloalkyl of 3 to 6 carbon atoms, 1,4-cyclohexadienyl, 2,4,6-cycloheptatrienyl, naphthyl, benzyl, phenethyl, indolylmethyl, furyl, thienyl and

wherein

Y is selected from the group consisting of hydrogen, nitro, di(lower alkyl)amino, lower alkanoylamino, lower alkyl, lower alkoxy, hydroxy, sulfamyl, chloro, bromo, fluoro, iodo and trifluoromethyl;

$R_2$ is selected from the group consisting of hydrogen and lower alkyl;

$R_1$ and $R_2$ when taken together with the carbon atom to which they are attached are cycloalkylidene of 3 to 10 carbon atoms;

$R_3$ is selected from the group consisting of hydrogen and methyl;

Each of $R_5$ and $R_6$ is selected from the group consisting of hydrogen and lower alkyl;

$R_4$ is selected from the group consisting of hydrogen, lower alkyl, carboxymethyl, carbamoylmethyl and amidino;

$R_4$ and $R_5$ when taken together with the amidino group to which they are attached form a heterocyclic ring of the formula

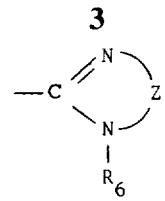

wherein
Z is selected from the group consisting of —N=CH—, —CH₂—C(O)—, —C(O)—CH=CH— and alkylene of from 2 to 5 carbon atoms;
and $m$ is 0 or 1.

Representative of the heterocyclic ring structures formed by the combination of $R_4$ and $R_5$ and the amidino group to which they are attached are 2-(2-imidazolinyl), 2-(1,4,5,6-tetrahydropyrimidinyl), 2-(1,3-diaza-1,7,5,6,7, -pentahydrocycloheptatrienyl), 2-(1,3-diaza-1,4,5,6,7,8-hexahydrocyclooctatetraenyl), 2-(1,4,5,6-tetrahydro-6-methylpyrimidinyl) and 2-(5-methylimidazolinyl). When Z is —N=CH—, the heterocyclic ring is 2-(1,2,4-triazolyl).

Included among the pharmaceutically-acceptable metal and amine salts of the compounds of this invention are salts such as the sodium, aluminum, potassium, calcium, magnesium, ammonium and substituted ammonium salts, e.g., procaine, dibenzylamine, N,N'-dibenzylethylenediamine, N,N'-bis(dehydroabietyl)-ethylenediamine, 1-ephenamine, N-ethylpiperidine, N-benzyl-β-phenethylamine, triethylamine, as well as salts with other amines which have been used to form salts with benzylpenicillin and which are useful for the preparation of pharmaceutically-elegant compositions of these valuable antibiotics.

Also included within the scope of this invention are the optically-active isomeric forms and mixtures thereof which arise by virtue of the asymmetric α-carbon atom of the acyl side chain. These are the D- and the L-diastereoisomers and the DL-form which is a mixture of the two optically-active isomers. The D-form of these compounds is the preferred form because of its greater activity relative to that of the L- or the DL-forms.

Other isomers of the herein described compounds in addition to those arising from the asymmetric α-carbon of the acyl side chain are, of course, possible because of the presence of asymmetric carbon atoms in the 6-aminopenicillanic acid nucleus.

The novel antibacterial products of this invention are of value as additives to materials such as fuels and cutting oils which are subject to bacterial deterioration are useful in soaps and shampoos and in topical compositions for treatment of wounds. They are also remarkably effective in treating a number of infections caused by susceptible gram-negative and gram-positive bacteria in poultry and animals, including man.

DETAILED DESCRIPTION OF THE INVENTION

The novel and valuable compounds of this invention are prepared by reacting an appropriate 6-[(α-amino-substituted)acylamido]penicillanic acid, or a suitable ester thereof, of the formula

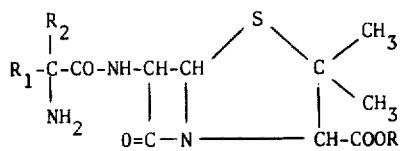

with a reactive functional derivative of the carboxy group of an appropriate thioamidino substituted acid of the formula

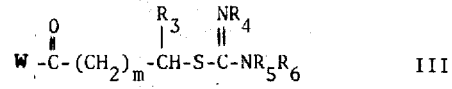

wherein the variables $m$, R and $R_1$-$R_6$ are as defined above, and W is hydroxy or a halo group.

Alternatively, and preferably, compounds of formula I can be prepared by reacting a compound of formula IV

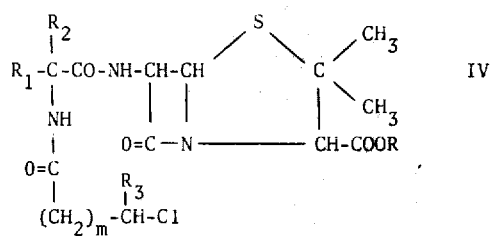

in the presence of sodium iodide in a reaction-inert solvent with

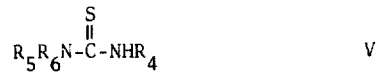

according to standard procedures.

The terms "lower alkyl, lower alkoxy and lower alkanoyloxy" as used herein are intended to include those alkyl, alkoxy and alkanoyloxy groups having from one to four carbon atoms.

Suitable esters of formula II reactants are those wherein R is acyloxy lower alkyl as defined above and those wherein R is a group which can readily be removed as, for example, by catalytic hydrogenation (benzyl, cyanomethyl, phenacyl and diphenylmethyl).

Suitable reactive functional derivatives of acids of formula III are the acid chlorides or bromides (W=Cl, Br). The acid reactant can be reacted with a "condensing" agent such as a carbodiimide, an alkoxyacetylene, N,N'-carbonyldiimidazole, N,N'-carbonylditriazole and hexahalocyclotriphosphatriazines to give a reactive intermediate which is coupled to the 6-[(α-amino substituted)acylamido]penicillanic acid. Additionally, the appropriate acid azide or an active ester or thio ester of the formula III reactant with, for example, N-hydroxyphthalimide, N-hydroxysuccinimide, a phenol or thiophenol can be used as acylating agent.

The preferred process of this invention comprises reaction of the appropriate 6-[α-(haloacylamido)]penicillanic acid compound (formula IV) with the appropriate thiourea (formula V) in the presence of sodium iodide in a reaction-inert solvent, e.g., acetone, for reasons of convenience, availability of reactants and overall yield of product. The amount of sodium iodide used is not critical but can vary widely. Molar ratios of sodium iodide to 6-[α-(haloacylamido)]penicillanic acid of from about 1:10 to about 2:1 are practical for this reaction. The favored range is from about 1:3 to about 1:1. Higher and lower ratios can be used but appear to be of no advantage. The reaction temperature is not critical. Temperatures of from about 10°C. to the reflux temperature are operative. The favored temperature range is from 20°C. to 40°C. The preferred range is from 25°C. to 35°C.

The 6-[α-(haloacylamido)]penicillanic acid reactants of formula IV are prepared by acylation of the appropriate 6-[(α-amino substituted)-acylamido]penicillanic acid (formula II) with the appropriate acylating agent of formula VI:

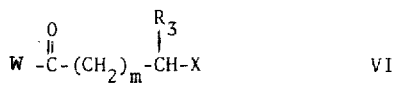
                          VI wherein W is as defined above and X is chloro or bromo. The procedures described above for the acylation of compounds of formula II with those of formula III are also applicable to the acylation of formula II compounds with compounds of formula VI.

The 6-[(α-amino substituted)acylamido]penicillanic acid reactant (formula II) and the 6-[α-(haloacylamido)]penicillanic acid reactant (formula IV) can be used in a variety of forms. They can, for example, be used as the free acids or as alkali metal or amine salts thereof. The use of a salt form of these reactants is frequently of advantage since the solubility can be manipulated by judicious choice of the salt to permit the use of aqueous or non-aqueous systems. Alkali metal salts are valuable for use in aqueous systems. In non-aqueous systems, an amine salt such as a tertiary lower alkylamine salt, e.g., triethylamine, or an N-alkyl piperidine salt is generally used. Alternatively, an ester of the formula II or formula IV reactant is used, especially in non-aqueous systems. In those instances wherein the final product (formula I) is desired in the form of an ester (R is other than hydrogen), it is obvious and practical to use that ester form of the reactant of formula II or formula IV.

The acylation of compounds of formulae II to IV is conducted in a reaction-inert solvent system which can be aqueous or non-aqueous. Aqueous or non-aqueous solvent systems can be used when a carbodiimide is the condensing agent. When using a carbodiimide in an aqueous system, the pH is desirably adjusted to the range of about 5 to about 8, and preferably to about 6 to 7. In a typical procedure, the formula III reactant and carbodiimide are mixed in equimolar proportions in a suitable solvent (tetrahydrofuran, dioxane) and a water-water-miscible organic solvent solution (water plus dioxane or tetrahydrofuran) containing the 6-[(α-amino substituted)acylamido]-penicillanic acid is added at room temperature and the mixture stirred for several hours until reaction is complete. Temperatures of from about −5° to 30°C. are generally used. In most instances, an excess up to about 10% of the condensing agent is used. The penicillin product is recovered by methods known to the art.

Acylation with an acid halide (formulae III and VI) can also be conducted in aqueous or non-aqueous solvent systems. In aqueous systems, the reaction is generally carried out at a pH of from about 6 to about 9 and a temperature of from about 0°C. to about 50°C. It can also be performed in unstable emulsions of water and a water-immiscible organic solvent such as methyl isobutyl ketone and lower alkyl acetates over the pH range of from about 2 to about 4.

In addition to the above purely chemical techniques of acylation, a sonochemical technique; that is, the application of vibrations of ultrasonic frequency (35,000 to 90,000 cycles per second), as described in U.S. Pat. No. 3,079,314, issued Feb. 26, 1963, can also be used to achieve acylation of the 6-[(α-amino substituted-)acylamido]penicillanic acid, especially acylation with an acid halide. Acylation under such conditions is rapid and permissive of a wide range of reaction media, aqueous and nonaqueous alike, homogeneous and non-homogeneous, including emulsified systems.

The esters of this invention, compounds of formula I wherein R is acyloxy(lower alkyl), can be prepared by reacting an alkali metal salt (sodium, potassium, lithium) of a compound of formula I wherein R is hydrogen with the appropriate acyloxy(lower alkyl) halide (chloride or bromide). The reaction is normally conducted in a reaction-inert solvent such as tetrahydrofuran, dimethylformamide, dimethylsulfoxide or hexamethylphosphoramide. In practice, the halide is added, usually dropwise, to a solution or suspension of an alkali metal salt of the nitroguanidino compound. At least one equivalent of the halide reactant is added but, in certain cases, it may be advantageous to employ as much as a 50 percent excess. The reaction is carried out at temperatures of from 0°C. to 50°C., and preferably from 20° to 30°C. Reaction time will vary according to the temperature employed and the reactivity of the appropriate starting materials. Normally, the reaction period will range from 1 to 20 hours.

Alternatively, and preferably, the acyloxy(lower alkyl) esters of formula I compounds are prepared by the above described acylation procedures but using the appropriate acyloxy(lower alkyl) ester of the appropriate 6-[(α-amino substituted)acylamido]penicillanic acid or 6-[α-(haloacylamido)]-penicillanic acid reactant in place of the non-esterified reactant. The acyloxy(lower alkyl) esters of the 6-[(α-amino substituted-)acylamido]penicillanic acids and 6-[α-(haloacylamido)]penicillanic acids are prepared according to methods described in Belgian Pat. No. 721,515, U.S. Pat. No. 3,660,575, and by Daehne et al., J. Med. Chem. 13, 607–612 (1970).

The acyloxy(lower alkyl) halides are synthesized from the corresponding acid chlorides and aldehydes or ketones in accordance with the general procedures of Ulich et al., J. Am. Chem. Soc. 43, 660 (1921) and Euranto et al., Acta. Chem. Scand. 20, 1273 (1966). The formation of esters from acid salts and alkyl halides is well documented in the chemical literature (Zook and Wagner, "Synthetic Organic Chemistry," John Wiley and Sons, Inc., New York, 1956, p. 484).

The 6-[(α-amino substituted)acylamido]penicillanic acid reactants are described in the art cited above.

The amidino thio substituted alkanoic acid reactants of formula III are prepared from the corresponding chloro, bromo or iodo substituted alkanoic acids by reacting the amino acid with thiourea. Examples illustrating the preparation of compounds within the scope of this invention are given below. In the formulae accompanying the examples, -APA- represents the moiety

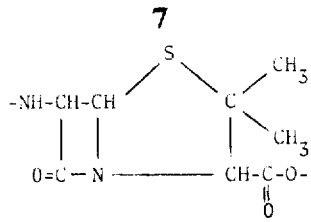

Tautomeric forms of the amidino moiety wherein at least one of $R_4$, $R_5$ and $R_6$ is other than hydrogen are also embraced within this invention.

The novel penicillins described herein exhibit in vitro activity against a wide variety of both gram-positive and gram-negative bacteria, including indole-positive Proteus. Their useful activity can readily be demonstrated by in vitro tests against various organisms in a brain-heart infusion medium by the usual two-fold serial dilution technique. The in vitro activity of the herein-described compounds renders them useful for topical application in the form of ointments, creams and the like, or for sterilization purposes, e.g., stick room utensils.

The in vitro spectra of a number of 6-[α-(amidinothioacetamido)-phenylacetamido]penicillanic acids of this invention against various bacteria are presented in Table I below. D-α-aminobenzylpenicillin (ampicillin) is included for comparison. The compounds of Table I have the formula

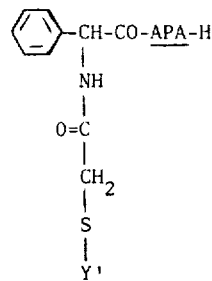

TABLE I

In Vitro Spectra of 6-[α-(Amidinothioacetamido)phenylacetamido]Penicillanic Acids [MIC's]

| Y' | E. coli 266 | E. coli 002 | Pseudo. aeruginosa 490 | Pseudo. aeruginosa 104 | Kleb. pneumoniae 173 | Kleb. pneumoniae 009 | A. aerogenes 015 | A. aerogenes 002 | Serratia marcesens 004 | P. mirabilis 001 | P. vulgaris 015 | S. aureus 005 |
|---|---|---|---|---|---|---|---|---|---|---|---|---|
| —C(NH)NH₂ | 12.5 | >200 | 12.5 | >200 | 100 | 100 | >200 | 200 | 12.5 | 25 | 6.25 | 6.25 | 0.049 |
| —C(NH)NHCH₃ | 6.25 | >200 | 12.5 | 200 | 100 | 200 | 200 | 100 | 12.5 | 25 | 6.25 | 12.5 | 0.098 |
| —C(NHCH₃)NHCH₃ | 12.5 | >200 | 12.5 | >200 | 200 | 200 | 200 | 100 | 25 | 200 | 6.25 | 12.5 | 0.098 |
| —C(NC₂H₅)NHC₂H₅ | 6.25 | >200 | 6.25 | 200 | 50 | 100 | >200 | 100 | 25 | 25 | 6.25 | 12.5 | 0.049 |
| —C(NHC₂H₅)NH₂ | 25 | >200 | 12.5 | 200 | 100 | 200 | >200 | 100 | 25 | 50 | 3.12 | 12.5 | 0.19 |
| —C(N—i—C₃H₇)NH(i—C₃H₇) | 25 | >200 | 12.5 | 100 | 100 | 200 | >200 | 100 | 100 | 100 | 50 | 50 | 1.56 |
| —C(NCH₂COOH)NH₂ | 6.25 | >200 | 12.5 | >200 | 100 | 200 | 200 | 100 | 12.5 | 25 | 3.12 | 25 | 0.049 |
| —C(NCH₂CONH₂)NH₂ | 6.25 | >200 | 12.5 | >200 | 100 | 100 | >200 | 100 | 25 | 100 | 6.25 | 12.5 | 0.195 |
| —C(NCH₂COOH)NHCH₃ | 12.5 | >200 | 12.5 | >200 | 100 | 200 | >200 | 100 | 25 | 50 | 12.5 | 25 | 0.049 |
| —C[-N—C(NH)NH₂]NHCH₃ | 6.25 | >200 | 1.56 | 50 | 25 | 100 | 100 | 200 | 25 | 50 | 6.25 | 25 | 0.195 |
| —C[N(CH₃)₂]N(CH₃)₂ | 25 | >200 | 3.12 | 100 | 100 | 200 | >200 | 50 | 200 | 25 | 12.5 | 25 | 1.56 |
| —C=N—CH₂—CH₂—NH | 12.5 | >200 | 3.12 | 25 | 12.5 | 100 | >200 | 12.5 | 50 | 12.5 | 1.56 | 3.12 | 0.39 |
| —C=N—CH₂—CH₂—CH₂—NH | 6.25 | >200 | 3.12 | 100 | 50 | 100 | 200 | 6.25 | 6.25 | 12.5 | 6.25 | 6.25 | 0.098 |
| —C=N—(CH₂)₄—NH | 12.5 | >200 | 1.56 | 25 | 12.5 | 100 | >200 | 100 | 50 | 25 | 6.25 | 12.5 | 0.098 |
| —C=N—(CH₂)₅—NH | 12.5 | >200 | 6.25 | 100 | 50 | 100 | 200 | 100 | 12.5 | 25 | 3.12 | 12.5 | 0.19 |
| —C=N—CH=N—NH | 50 | >200 | 0.78 | 50 | 25 | 200 | 200 | 100 | 200 | 50 | 25 | 50 | 0.78 |
| —C=N—(CH₂)₃—N—CH₃ | 3.12 | >200 | 12.5 | >200 | 100 | 200 | 200 | 25 | 25 | >200 | 6.25 | 25 | 0.19 |
| —C=N—(CH)₂—CH(CH₃)—NH | 12.5 | >200 | 6.25 | 100 | 25 | 100 | >200 | 12.5 | 25 | 50 | 6.25 | 12.5 | 0.39 |
| —C(N—n—C₄H₉)NH—(n—C₄H₉) | 25 | >200 | 25 | >200 | 200 | >200 | >200 | 200 | 50 | 100 | 25 | 100 | 1.56 |
| —C=N—C(O)—CH₂—NH | 6.25 | >200 | 1.56 | 50 | 25 | 200 | 200 | 25 | 25 | 25 | 12.5 | 50 | 1.56 |
| —C=N—CH=CH—C(O)—NH | 12.5 | >200 | 0.78 | 12.5 | 12.5 | 100 | >200 | 100 | 100 | 50 | 12.5 | 12.5 | 1.56 |
| —C=N—CH₂—CH(CH₃)—NH | 25 | >200 | 3.12 | 100 | 50 | 100 | >200 | 50 | 50 | 25 | 12.5 | 12.5 | 0.78 |
| —C=N—CH₂—CH—N—CH₃ | 25 | >200 | 3.12 | 100 | 25 | 100 | 200 | 100 | 50 | 50 | 25 | 6.25 | 1.56 |
| Ampicillin | 3.1 | — | 0.78 | 200 | 200 | — | — | — | — | 200 | 1.5 | 6 | — |

Additionally, the compounds of this invention are active versus gram-positive and gram-negative bacteria in vivo via the parenteral route of administration in animals, including man. Their in vivo activity in animals, including man, by the oral route of administration is more limited as regards susceptible organisms. Nevertheless, oral in vivo activity against *Escherichia coli* and *Staphylococcus aureus* is a common property of many compounds of this invention. Table II below presents the in vivo spectra of several compounds within the scope of this invention against *Escherichia coli* 266 and *Pseudomonas aeruginosa* 104.

The compounds of Table II have the formula shown above for Table I compounds.

on the order of from about 10-200 mg./kg./day.

When used for the purposes described herein, the valuable products of this invention can be used alone or in admixture with other antibiotics or in combination with a pharmaceutical carrier selected on the basis of the chosen route of administration and standard pharmaceutical practice. For example, they may be administered orally in the form of tablets containing such excipients as starch, milk sugar, certain types of clay, etc., or in capsules alone or in admixture with the same or equivalent excipients. They may also be administered orally in the form of elixirs or oral suspensions which may contain flavoring or coloring agents, or be injected parenterally, that is, for example, intramuscu-

TABLE II

In Vivo Spectrum of 6—[α—(Amidinothioacetamido)Phenyl-acetamido]Penicillanic Acids Versus *Escherichia coli* 266 and *Pseudomonas aeruginosa* 104 in Mice. % Protection (mg./kg.)

| Y' | *E. coli* 266 PO (oral) | | | *E. coli* 266 SC(subcutaneous) | | | Pseud. aeruginosa |
|---|---|---|---|---|---|---|---|
|  | 200 | 50 | 25 | 200 | 50 | 25 | 400 |
| —C(NH)NH$_2$ | 40 | 10 | 10 | 100 | 60 | 50 | 10 |
| —C(NH)NHCH$_3$ | 40 | 10 | 0 | 80 | 60 | 50 | — |
| —C(NCH$_3$)NHCH$_3$ | 60 | 30 | 10 | 40 | 20 | 0 | — |
| —C(NC$_2$H$_5$)NHC$_2$H$_5$ | 30 | 10 | 0 | 90 | 70 | 60 | 0 |
| —C(NC$_2$H$_5$)NH$_2$ | 20 | 10 | 0 | 70 | 40 | 40 | 0 |
| —C(N—n—C$_4$H$_9$)NH-(n—C$_4$H$_9$) | 10 | 0 | 0 | 30 | 0 | 0 | 10 |
| —C(N—i—C$_3$H$_7$)NH(i—C$_3$H$_7$) | 0 | 0 | 0 | 10 | 0 | 0 | 30 |
| —C(NCH$_2$COOH)NH$_2$ | 80 | 30 | 10 | 90 | 70 | 30 | 20 |
| —C(NCH$_2$CONH$_2$)NH$_2$ | 60 | — | — | — | 20 | 20 | 10 |
| —C(NCH$_2$COOH)NHCH$_3$ | 80 | — | — | — | 40 | 20 | 10 |
| —C[N—C(NH)NH$_2$]NHCH$_3$ | 100 | — | — | — | 80 | 60 | 30 |
| —C[N(CH$_3$)$_2$]N(CH$_3$)$_2$ | 0 | — | — | 30 | 10 | 0 | 0 |
| —C=N—CH$_2$—CH$_2$—NH | 0 | 0 | 0 | 80 | 30 | 20 | 0 |
| —C=N—CH$_2$—CH$_2$—CH$_2$—NH | 90 | 0 | 10 | 90 | 80 | 70 | 0 |
| —C=N—(CH$_2$)$_4$—NH | 30 | 20 | 10 | 80 | 0 | 0 | 0 |
| —C=N—(CH$_2$)$_5$—NH | 30 | 20 | 10 | 80 | 20 | 0 | 10 |
| —C=N—CH=N—NH | 0 | 0 | 0 | 10 | 0 | 0 | 20 |
| —C=N—C(O)—CH$_2$—NH | 20 | 10 | 10 | 20 | 10 | 10 | — |
| —C=N—CH=CH—C(O)—NH | 0 | — | — | — | 0 | 0 | 20 |
| —C=N—CH$_2$—CH(CH$_3$)—NH | 0 | — | — | 0 | 0 | 0 | 0 |
| —C=N—CH$_2$—CH$_2$—N—CH$_3$ | 0 | — | — | 40 | 0 | 0 | 0 |
| —C=N—(CH$_2$)$_3$—N—CH$_3$ | 80 | — | — | 80 | 60 | 20 | 0 |
| —C=N—CH$_2$CH$_2$CH(CH$_3$)—NH | 0 | — | — | 80 | — | — | 0 |

The oral and parenteral dosage levels for the herein described compounds are, in general, on the order of from about 25-200 mg./kg. of body weight per day and from about 10-100 mg./kg. of body weight per day, respectively. For topical application, the dosage level is larly or subcutaneously. For parenteral administration they are best used in the form of a sterile solution or suspension which may be either aqueous such as water, isotonic saline, isotonic dextrose, Ringer's solution; or non-aqueous such as fatty oils of vegetable origin (cotton seed, peanut oil, corn, sesame) and other non-aqueous vehicles which will not interfere with the therapeutic efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc; buffering agents, as well as local anesthetics and inorganic salts to afford desirable pharmacological properties.

Many of the penicillin ester compounds of this invention exhibit improved absorption on oral administration over that produced by the corresponding free acid or alkali metal salt forms. They, therefore, represent convenient and effective dosage forms of the novel penicillins of formula I above.

Further, many of the acyloxy(lower alkyl) esters described herein, although inactive or of relatively low activity against gram-negative organisms per se are, when administered orally to animals, including man, metabolized to the parent acid which has a wide spectrum of activity against gram-positive and gram-negative bacteria. They thus serve as sources of the parent compounds since they are biologically converted in vivo to said compounds. The rate of metabolic conversion of such esters to the parent acid occurs at such a rate as to provide an effective and prolonged concentration of the parent acid in the animal body. In effect, such esters act as depot sources for the parent acid. Especially useful in this respect are the benzoyloxymethyl-, acetoxymethyl-, acetoxyethyl-, pivaloyloxymethyl- and α-ethylbutyryloxymethyl esters.

Compounds of formula I in which the carbonyl group of the amidinothioacylamido moiety is replaced by $-SO_2-$; and such compounds, as well as those compounds of formula I, wherein at least one of $R_3$, $R_4$, $R_5$ or $R_6$ is alkenyl of from two to six carbon atoms are also, effective antibacterial agents in the same manner as are the products embraced by formula I above. Such products are prepared by the methods described herein using as reactants the appropriate α-amino substituted acylamidopenicillanic acid of formula II and the appropriate amidinothio substituted acid derivative of formula III or the corresponding sulfonic acid derivative wherein the $R_3$ - $R_6$ variables are as disclosed above; or the appropriate 6-[α-(haloacylamido)acetamido]-penicillanic acid (formula IV) and the appropriate thiourea (formula V).

Additionally, analogous derivatives of 7-aminocephalosporanic acid, and its close derivatives, i.e., desacetoxy 7-aminocephalosporanic acid, desacetyl 7-aminocephalosporanic acid and tertiary amine derivatives of 7-aminocephalosporanic acid wherein the 3-acetoxy group is displaced by a tertiary amine function as antibacterial agents against both gram-positive and gram-negative bacteria. Such derivatives are used in substantially the same manner as are the 6-[α-(amidinothioacylamido)acylamido]penicillanic acid derivatives described herein. They are prepared by acylation of the appropriate 7-[(α-amino-substituted)acylamido]cephalosporanic acid compounds of formula VII below with a reactive functional derivative of an appropriate amidinothio substituted acid of formula III, or, preferably, by reaction of the appropriate 7-[α-(haloacylamido)acylamido]cephalosporanic acid with the appropriate thiourea compound according to methods described herein

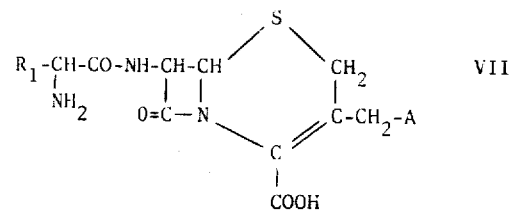

In formula VII, $R_1$ is as defined above and A is selected from the group consisting of hydrogen, hydroxy, acetoxy and tertiary amino. Representative of the tertiary amino groups which displace the acetoxy moiety are pyridine, imidazole, benzimidazole, pyrimidine and substituted derivatives of these amines and tri(alkyl)amines (especially those wherein the alkyl group contains from one to six carbon atoms). Additionally, other amines and other nucleophiles such as sulfur compounds (e.g., thiourea, xanthates, dithiocarbamates, mercaptoimidazole, alkyl and aryl mercaptans), and carbon nucleophiles (e.g., indole, N-methyl-indole, resorcinol) also displace the 3-acetoxy group to afford compounds of formula VII wherein A represents the nucleophilic agent to afford effective broad-spectrum antibacterial agents. Compounds of formula VII, or methods for their preparation, are described in the literature; U.S. Pat. No. 3,560,489; U.S. Pat. No. 3,575,969; French Pat. No. 2,032,408; J. Antibiot. Ser. A 19 (6), 243–9 (1966); Cocker et al., J. Chem. Soc., 5015–5031 (1969). The haloacyl derivatives of VII are prepared from formula VII compounds by acylation with the appropriate halocarboxylic acid or acid chloride thereof in the same manner as are compounds of formula IV above.

Further, similar derivatives of 6-(α-ureidoacylamido)penicillanic acid and of 7-(α-ureidoacylamido)cephalosporanic acid and its close derivatives, which are prepared by the methods described above from the appropriate α-ureido derivatives of 6-aminopenicillanic acid and 7-aminocephalosporanic acids, are useful bactericides in the same manner as are the compounds of formula I.

EXAMPLE 1

6-[α-(N,N'-Diethylamidinothioacetamido)-Phenylacetamido]-Penicillanic Acid

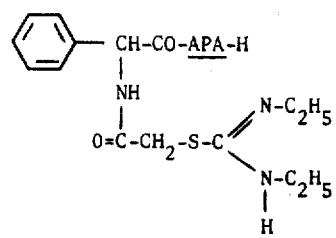

To a solution of sodium iodide (600 mg., 4 mM) in acetone (20 ml.) at 25°C. was added with stirring 6-[α-(chloroacetamido)phenylacetamido]penicillanic acid triethylamine salt (2.1 g., 4 mM) followed quickly by N,N'-diethylthiourea (529 mg., 4 mM). The mixture was stirred at 25°C. for 24 hours and the acetone then decanted from the gummy precipitate which had formed. Fresh acetone (20 ml.) was added to the gummy precipitate, the mixture stirred and the resulting off-white solid collected, washed with acetone and dried overnight over phosphorous pentoxide in vacuo. Yield 1.35 g., 65%. The infrared and nuclear magnetic resonance spectra were consistent with the above structure.

EXAMPLE II

6-{α-[2-(1,4,5,6-Tetrahydropyrimidinyl)thio acetamido]-Phenylacetamido}Penicillanic Acid

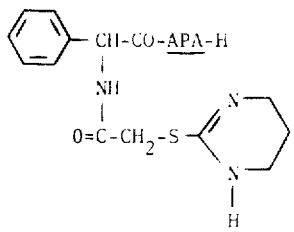

Sodium iodide (300 mg., 2 mM), acetone (20 ml.), 6-[α-(chloroacetamido)phenylacetamido]penicillanic acid triethylamine salt (1.053 g., 2 mM) and 2-mercapto-2-(1,4,5,6-tetrahydropyrimidine) (232 mg., 2 mM) were reacted according to the procedure of Example I to give a 99% yield of the title product.

In like manner but using the appropriate thiourea reactant, $S=C(NHR_4)NR_5R_6$, the compounds listed below are prepared. Infrared and nuclear magnetic resonance spectra were consistent with the structures indicated.

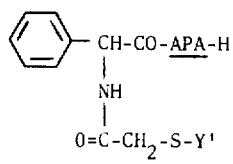

| Y' | % Yield |
|---|---|
| —C(NH)NH$_2$ | 108 |
| —C(NH)NHCH$_3$ | 86 |
| —C(NCH$_3$)NHCH$_3$ | 61 |
| —C(NC$_2$H$_5$)NH$_2$ | 61 |
| —C(N—i—C$_3$H$_7$)NH(i—C$_3$H$_7$) | 32.8 |
| —C(N—n—C$_4$H$_9$NH(n—C$_4$H$_9$) | 26 |
| —(C[N(CH$_3$)$_2$]N(CH$_3$)$_2$ | 71.5 |
| —C[N—C(NH)NH$_2$]NHCH$_3$ | 96 |
| —C(NCH$_2$COOH)NH$_2$ | 86 |
| —C(NCH$_2$CONH$_2$)NH$_2$ | 71.5 |
| —C(NCH$_2$COOH)NHCH$_3$ | 60.5 |
| —C=N—CH$_2$—CH$_2$—NH (cyclic) | 100 |
| —C=N—(CH$_2$)$_4$—NH (cyclic) | 84 |
| —C=N—(CH$_2$)$_3$—NH (cyclic) | 84 |
| —C=N—CH$_2$CH(CH$_3$)—NH (cyclic) | 99 |
| —C=N—CH$_2$CH$_2$—NCH$_3$ (cyclic) | 74.5 |
| —C=N—CH$_2$CH$_2$CH(CH$_3$)—NH (cyclic) | 91.5 |
| —C=N—(CH$_2$)$_3$—NCH$_3$ (cyclic) | 81 |
| —C=N—CH=N—NH (cyclic) | 69 |
| —C=N—CH$_2$—C(O)—NH (cyclic) | 42.7 |
| —C=N—C(O)—CH=CH—NH (cyclic) | 48.5* |

*N,N—dimethylformamide used as solvent

EXAMPLE III

Following the procedure of Example I but using the appropriate thiourea and 6-α-(chloroacylamido)arylacylamido]penicillanic acid reactants of formulae III and IV, respectively, affords the compounds tabulated below:

$$R_1-\underset{\underset{NH}{|}}{\overset{\overset{R_2}{|}}{C}}-CO-\underline{APA}-R$$
$$O=C-(CH_2)_m-\underset{\underset{R_3}{|}}{CH}-S-Y'$$

| R$_1$ | R$_2$ | R$_3$ | m | Y' | R |
|---|---|---|---|---|---|
| C$_6$H$_5$ | H | H | 0 | —C(NH)NH$_2$ | CH$_2$OCOC(CH$_3$)$_3$ |
| C$_6$H$_5$ | H | CH$_3$ | 0 | —C(NH)NH$_2$ | H |
| C$_6$H$_5$ | H | CH$_3$ | 1 | C(NH)NH$_2$ | CH$_2$OCOCH$_3$ |
| C$_6$H$_5$ | H | CH$_3$ | 0 | —C=N—CH$_2$CH$_2$CH$_2$—NH (cyclic) | CH$_2$OCOC(CH$_3$)$_3$ |
| C$_6$H$_5$ | H | H | 1 | —C[N—C(NH)NH$_2$]NHCH$_3$ | H |
| 4—ClC$_6$H$_4$ | H | H | 0 | —C(NCH$_2$COOH)NH$_2$ | H |
| 4—ClC$_6$H$_4$ | H | CH$_3$ | 0 | —C(NC$_2$H$_5$)NHC$_2$H$_5$ | CH$_2$OCO(n—C$_3$H$_7$) |
| 3—BrC$_6$H$_4$ | H | CH$_3$ | 0 | —C(NH)NH$_2$ | CH$_2$OCOC$_6$H$_5$ |
| 4—FC$_6$H$_4$ | H | H | 1 | —C(NCH$_3$)NHCH$_3$ | H |
| 2—NO$_2$C$_6$H$_4$ | H | O | H | —C=N—CH$_2$—CH$_2$—NH (cyclic) | H |
| 2—NO$_2$C$_6$H$_4$ | H | CH$_3$ | 1 | —C=N—(CH$_2$)$_4$—NH (cyclic) | CH$_2$OCO(4—CF$_3$C$_6$H$_4$) |
| 4—CF$_3$C$_6$H$_4$ | H | H | 0 | —C=N—C(O)—CH=CH—NH (cyclic) | H |
| 2—CH$_3$C$_6$H$_4$ | H | H | 0 | —C(NC$_2$H$_5$)NH$_2$ | CH$_2$OCOCH(C$_2$H$_5$)$_2$ |
| 4—t—C$_4$H$_9$C$_6$H$_4$ | H | H | 0 | —C(NCH$_2$CONH$_2$)NH$_2$ | H |

-Continued

| R₁ | R₂ | R₃ | m | Y' | R |
|---|---|---|---|---|---|
| 4—t—C₄H₉C₆H₄ | H | CH₃ | 1 | —C=N—(CH₂)₃—NH | H |
| 2—HOC₆H₄ | H | H | 0 | —C(NH)NH₂ | H |
| 3—HOC₆H₄ | H | H | 0 | —C=N—CH=N—NH | CH(CH₃)OCOCH₃ |
| 4—HOC₆H₄ | H | CH₃ | 0 | —C=N—CH₂CH₂CH₂—NH | H |
| 4—HOC₆H₄ | H | H | 1 | —C[NC(NH)NH₂]NHCH₃ | H |
| 2—HOC₆H₄ | H | CH₃ | 1 | —C=N—(CH₂)₃—NH | |
| 3—CH₃C₆H₄ | H | H | 0 | —C=N—CH₂—C(O)—NH | H |
| 2—CH₃OC₆H₄ | H | H | 0 | —C=N—(CH₂)₄—N—CH₃ | H |
| 4—n—C₄H₉OC₆H₄ | H | H | 0 | —C(N—i—C₃H₇)NH(i—C₃H₇) | H |
| 4—(C₂H₅)₂NC₆H₄ | H | H | 0 | —C(NH)NH₂ | CH₂OCOCH(CH₃)₂ |
| 2—(CH₃)₂NC₆H₄ | H | H | 0 | —C=N—CH₂CH₂CH₂—NH | H |
| 2—(CH₃)₂NC₆H₄ | H | CH₃ | 1 | —C=N—CH₂CH(CH₃)NH | H |
| 2—CH₃CONHC₆H₄ | H | H | 0 | —C=N—C(O)—CH=CH—NH | H |
| 4—H₂NSO₂C₆H₄ | H | H | 0 | —C(NCH₃)NHCH₃ | H |
| 4—H₂NSO₂C₆H₄ | H | H | 1 | —C(NH)NHC₂H₅ | H |
| 2—CH₃CONHC₆H₄ | H | CH₃ | 1 | —C=N—CH₂CH₂NCH₃ | H |
| 4—ClC₆H₄ | H | CH₃ | 0 | —C(N—n—C₄H₉)NH(n—C₄H₉) | H |
| 2—CH₃C₆H₄ | H | CH₃ | 0 | —C=N—(CH₂)₄—NH | H |
| 2—CH₃OC₆H₄ | H | CH₃ | 0 | —C(NCH₃)NHCH₃ | H |
| 4—H₂NSO₂C₆H₄ | H | CH₃ | 0 | —C=N—CH₂CH₂CH₂—NH | H |
| 4—ClC₆H₄ | H | H | 1 | —C(NH)NH(n—C₄H₉) | CH₂OCO(4—ClC₆H₄) |
| 2—CH₃OC₆H₄ | H | CH₃ | 1 | —C(NCH₂COOH)NHCH₃ | CH₂OCO(2—CH₃C₆H₄) |
| C₆H₅CH₂ | H | CH₃ | 0 | —C(NC₂H₅)NHC₂H₅ | H |
| C₆H₅CH₂ | H | H | 1 | —C=N—CH₂CH₂CH₂—NH | H |
| i—C₃H₇ | H | CH₃ | 0 | —C=N—(CH₂)₄—NH | CH₂OCO(3—BrC₆H₄) |
| C₃H₅ | CH₃ | CH₃ | 1 | —C(NCH₂CONH₂)NHCH₃ | H |
| C₃H₅ | CH₃ | H | 0 | —C=N—C(O)—CH=CH—NH | H |
| C₆H₁₁ | H | H | 0 | —C(NH)NH₂ | CH₂OCOC(CH₃)₃ |
| C₆H₁₁ | H | H | 0 | —C=N—CH₂CH₂CH₂—NCH₃ | H |
| C₆H₁₁ | H | H | 1 | —C=N—CH₂CH(CH₃)—NH | |
| C₆H₅ | H | H | 1 | —C=N—CH₂—C(O)—NH | CH₂OCOCH₃ |
| C₃H₅ | CH₃ | H | 0 | —C(NH)NH₂ | CH(C₂H₅)OCOCH₃ |
| C₆H₅CH₂CH₂ | H | CH₃ | 0 | —C(NC₂H₅)NHC₂H₅ | H |
| 1—naphthyl | H | H | 0 | —C=N—CH₂CH₂CH₂—NH | H |
| 1—naphthyl | H | CH₃ | 1 | —C(NCH₂CONH₂)NH₂ | H |
| 1,4-cyclohexadienyl | H | H | 0 | —C(NH)NCH₃ | H |
| 1,4-cyclohexadienyl | H | H | 0 | —C[N—C(NH)NH₂]NHCH₃ | H |
| 3-indolylmethyl | H | CH₃ | 0 | —C=NCH₂CH₂N—CH₃ | H |
| 3-indolylmethyl | H | H | 1 | —C(NCH₃)NHCH₃ | CH₂OCOC₂H₅ |
| 2-thienyl | H | H | 0 | —C=N(CH₂)₃NH | H |
| 3-thienyl | H | H | 0 | —C(NCH₃)NHCH₃ | H |
| 3-thienyl | H | CH₃ | 1 | —C(NCH₂COOH)NHCH₃ | CH₂OCOCH₃ |
| 2-furyl | H | H | 0 | —C(NH)NH₂ | H |
| 2-furyl | H | CH₃ | 0 | —C(NC₂H₅)NHC₂H₅ | H |
| C₆H₅ | CH₃ | H | 0 | —C(NH)NH₂ | H |
| C₆H₅ | CH₃ | H | 1 | —C=NCH₂CH₂CH(CH₃)NH | CH₂OCO(4—FC₆H₄) |
| CH₃ | CH₃ | H | 1 | —C(NC₂H₅)NHC₂H₅ | CH₂OCO(4—n—C₄H₉OC₆H₄) |
| C₂H₅ | CH₃ | CH₃ | 0 | —C=N—(CH₂)₄—NH | H |

—Continued

| R₁ | R₂ | R₃ | m | Y' | R |
|---|---|---|---|---|---|
| C₂H₅ | C₂H₅ | H | 1 | —C(NH)NH₂ | H |
| n—C₆H₁₃ | H | H | O | —C(NH)NH₂ | H |
| —CH₂—CH₂— | | H | O | —C(NH)NH₂ | H |
| —CH₂—CH₂— | | CH₃ | O | —C(NCH₂CONH₂)NH₂ | H |
| —CH₂—CH₂— | | H | 1 | —C(NCH₃)NHCH₃ | H |
| —CH₂—CH₂—CH₂— | | H | O | —C=NCH₂CH₂CH₂—NH | H |
| —CH₂—CH₂—CH₂— | | H | 1 | —C(NH)NH₂ | H |
| —(CH₂)₃— | | H | O | —C[N—C(NH)NH₂]NHCH₃ | H |
| —(CH₂)₃— | | CH₃ | 1 | —C(NCH₂COOH)NHCH₃ | H |
| —(CH₂)₃— | | H | O | —C(NH)NH₂ | H |
| —(CH₂)₃— | | CH₃ | O | —C(NH)NH₂ | CH₂OCOC(CH₃)₃ |
| —(CH₂)₃— | | H | 1 | —C=N—(CH₂)₄—NH | H |
| —(CH₂)₃— | | H | O | —C(NC₂H₅)NHC₂H₅ | CH₂OCO(2—CH₃OC₆H₄) |
| C₆H₅ | H | H | O | —C(NC₂H₅)NH(n—C₃H₇) | H |
| C₆H₅ | H | CH₃ | O | —C(NC₂H₅)NH(n—C₃H₇) | H |
| 3-thienyl | H | H | O | —C(NC₂H₅)NH(n—C₃H₇) | H |
| C₆H₅ | H | H | O | —C(NC₂H₅)NH(n—C₃H₇) | CH₂OCOC(CH₃)₃ |
| 4—IC₆H₄ | H | H | O | —C(NH)NH₂ | H |
| 2,4,6—C₇H₇ * | H | H | O | —C(NH)NH₂ | H |
| 2,4,6—C₇H₇ | H | H | O | —C=N—CH₂CH₂CH₂—NH | H |
| 2,4,6—C₇H₇ | H | CH₃ | 1 | —C(NH)NHCH₃ | CH₂OCOCH₃ |

*2,4,6—C₇H₇ = 2,4,6—cycloheptatrienyl

EXAMPLE IV

6-[α-(Amidinothioacetamido)Phenylacetamido]-Penicillanic acid

To carboxymethylisothiourea (1.34 g., 0.01 M) in tetrahydrofuran (30 ml.) is added 1,3-dicyclohexylcarbodiimide (2.06 g., 0.01M) in tetrahydrofuran (10 ml.) followed by a solution of 6-(α-aminophenylacetamido)penicillanic acid (2.16 g., 0.01M) in water-tetrahydrofuran (60 ml. of 1:1) containing sufficient sodium bicarbonate to give a pH of 7.8. The mixture is stirred at room temperature for two hours and then filtered to remove 1,3-dicyclohexylurea. The filtrate is evaporated under reduced pressure to give the title product.

The following compounds are prepared from appropriate reactants by this process:

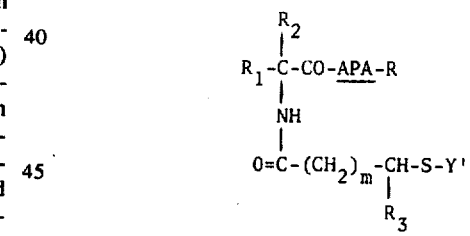

| R₁ | R₂ | R₃ | m | Y' | R |
|---|---|---|---|---|---|
| C₆H₅ | H | H | 1 | —C(NH)NH₂ | H |
| C₆H₅ | H | H | O | —C(NH)NH₂ | CH₂OCOC(CH₃)₃ |
| C₆H₅ | H | CH₃ | 1 | —C(NH)NH₂ | H |
| 3-thienyl | H | H | O | —C(NH)NH₂ | H |
| 3-thienyl | H | H | 1 | —C(NH)NH₂ | H |
| C₆H₁₁ | H | H | O | —C(NH)NH₂ | H |
| C₆H₁₁ | H | H | O | —C(NH)NH₂ | CH₂OCOCH(C₂H₅)₂ |
| 1,4-cyclohexadienyl | H | H | O | —C(NH)NH₂ | H |
| —CH₂—CH₂— | | H | O | —C(NH)NH₂ | H |
| —(CH₂)₃— | | H | O | —C(NH)NH₂ | H |
| —(CH₂)₃— | | CH₃ | 1 | —C(NH)NH₂ | H |
| —(CH₂)₃— | | H | O | —C(NH)NH₂ | H |
| C₆H₅ | H | H | O | —C=N—CH₂—CH₂—NH | H |
| C₆H₅CH₂ | H | H | O | —C=N—CH₂—CH₂—NH | H |

—Continued

| R₁ | R₂ | R₃ | m | Y' | R |
|---|---|---|---|---|---|
| 3-thienyl | H | H | O | —C=N—CH₂—CH₂—NH | H |
| C₆H₁₁ | H | H | O | —C=N—CH₂—CH₂—NH | H |
| 3-indolylmethyl | H | H | O | —C=N—CH₂—CH₂—NH | H |
| 4—ClC₆H₄ | H | H | O | —C=N—CH₂—CH₂—NH | H |
| —(CH₂)₅— | | H | O | —C=N—CH₂—CH₂—NH | H |

EXAMPLE V

Sodium 6-[α-(N,N'-Diethylamidinothioacetamido)-Phenylacetamido]Penicillante One equivalent of sodium hydroxide (0.04 g., 1.0 mM) in water (3 ml.) is added dropwise to 6-[α-(N,N'-diethylamidinothioacetamido)phenylacetamido]-penicillanic acid (0.521 g., 1.0 mM) in water (10 ml.) with stirring. The mixture is stirred for 15 minutes and then freeze-dried to give the salt. Sodium carbonate affords the same product.

By means of this procedure, but using the appropriate base, the products of Examples I-IV are converted to their sodium, potassium, calcium, magnesium, ammonium, procaine, N,N'-dibenzylethylenediamine, N-ethylpiperidine, dibenzylamine, 1-ephenamine, triethylamine, N-benzyl-β-phenethylamine, N,N'-bis(dehydroabietyl)ethylenediamine and benzhydrylamine salts.

The nuclear magnetic resonance spectra (ppm in dimethylsulfoxide at 60 Mc) of several 6-[α-(amidinothioacetamido)phenylacetamido]penicillanic acids within the scope of this invention are presented in Table III below. The portion of the molecule above the dotted line in the formula below, common to all compounds of Table III and the compound wherein Y' is amidino, gave the same values; namely, 1.3 (3H,s), 1.5 (3H,s), 4.0 (1H,s), 4.1 (2H,s), 5.3 (2H,q), 5.7 (1H,s), and is not included in the Table. Only the values for the amidino moiety of the compounds are presented.

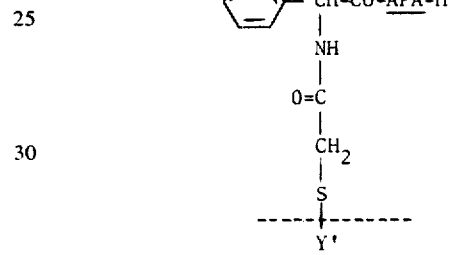

TABLE III

Nuclear Magnetic Resonance Data for the Y' Moiety (ppm; in DMSO at 60 Mc)

| Y' | δ NMR (ppm)* |
|---|---|
| —C(NH)NHCH₃ | 2.9 (3H,s) |
| —C(NCH)NHCH₃ | 2.9 (6H,s) |
| —C(NC₂H₅)NHC₂H₅ | 1.1 (6H,t), 3.4 (4H,q) |
| —C(NH)NHC₂H₅ | 1.0 (3H,t), 3.3 (2H,q) |
| —C(N—i—C₃H₇)NH(i—C₃H₇) | 1.1 (12H,d,J=6Hz), 4.0 (2H,m) |
| —C[N(CH₃)₂]ₙₕ ₘ₂ | 3.0 (12H,s) |
| —C(N—n—C₄H₉)NH(n—C₄H₉) | 1.2-1.4 (14H,m), 3.4 (4H,t) |
| —C[NC(NH)NH₂]ₙₕ ₘ | 3.1 (3H,s) |
| —C(NCH₂COOH)NH₂ | 3.8 (2H,s) |
| —C(NCH₂COOH)NHCH₃ | 3.5 (2H,s), 3.9 (3H,s) |
| —C(NCH₂CONH₂)NH₂ | 3.9 (2H,s) |
| —C=N—CH₂—CH₂—NH | 4.0 (4H,s) |
| —C=N—CH₂CH₂CH₂—ₙₕ | 1.7 (2H,m), 3.3 (4H,m) |
| —C=N—(CH₂)₃—N—H | 1.7 (4H,m), 3.4 (4H,m) |
| —C=N—(CH₂)₄—N— H | 1.5 (6H,m), 3.7 (4H,m) |
| —C=N—CH=N—NH | 8.3 (1H,s) |
| —C=N—C(O)—CH₂—NH | 3.9 (2H,s) |
| —C=N—CH=CH—C(O)—NH | 6.1 (1H,d,J=6), 7.8 (1H,d,J=6Hz) |
| —C=N—(CH₂)₂—CH(CH₃)—NH | (3H,d,J=6Hz), 1.7 (2H,m), 3.3–3.6 (3H,m) |
| —C=N—(CH₂)₃—N—CH₃ | 1.8 (2H,m), 3.1 (3H,s), 3.4 (4H,m) |
| —C=N—CH₂—CH(CH₃)—NH | 1.2 (3H,d,J=6Hz), 4.0 (3H,m) |
| —C=N—CH₂CH₂—N—CH₃ | 2.9 3H,s), 3.7 (4H,s) |

*s=singlet; d=doublet; t=triplet; q=quartet; m=multiplet.
Internal standard=tetramethylsilane.

EXAMPLE VI

A tablet base is prepared by blending the following ingredients in the proportion by weight indicated:

| | |
|---|---|
| Sucrose | 80.0 |
| Tapioca starch | 12.5 |
| Magnesium stearate | 7.5 |

Sufficient potassium 6-{α-[2-(1,4,5,6-tetrahydropyrimidinyl)thioacetamido]phenylacetamido} penicillanate is blended into the base to provide tablets containing 25, 50, 100 and 250 mg. (calculated as the free acid) of the penicillin salt.

EXAMPLE VII

Capsules containing 25, 100 and 250 mg. of active ingredient (calculated as the free acid) are prepared by blending sodium 6-[α-(N-amidino-N'-methylamidinothioacetamido)phenylacetamido]-penicillanate in the following mixture (proportions are given in parts by weight):

| | |
|---|---|
| Calcium carbonate, U.S.P. | 17.5 |
| Dicalcium phosphate | 18.9 |
| Magnesium trisilicate | 4.2 |
| Lactose, U.S.P. | 6.2 |
| Potato starch | 5.2 |
| Magnesium stearate | 1.0 |

EXAMPLE VIII

A suspension of sodium 6-{α-(1,4,5,6-tetrahydropyrimidinyl)thioacetamido]phenylacetamido} penicillanate having the following composition is prepared:

| | |
|---|---|
| Penicillin | 31.42 g. |
| 70% aqueous sorbitol | 714.29 g. |
| Glycerine, U.S.P. | 185.35 g. |
| Gum acacia (10% solution) | 100.00 ml. |
| Polyvinyl pyrrolidione | 0.50 g. |
| Propyl parahydroxybenzoate | 0.172 g. |
| Distilled water to make one liter | 0.094 g. |

Various sweetening and flavoring agents may be added to this suspension, as well as acceptable coloring. The suspension contains approximately 25 mg. of penicillin compound per milliliter.

EXAMPLE IX

A parenteral form of 6-[α-(amidinothioacetamido)-phenylacetamido]-penicillanic acid is prepared by dissolving an intimate mixture of the sodium salt of the penicillin compound and sodium citrate (4 percent by weight) in sufficient polyethylene glycol 200 such that the final concentration of the penicillin compound is 25 mg. of active ingredient per milliliter. The resulting solution is sterilized by filtration and sterilely stoppered in vials.

Formulations of the products of this invention are made by repetition of the above procedures.

PREPARATION A

6-[α-(Chloroacetamido)phenylacetamido]Penicillanic Acid

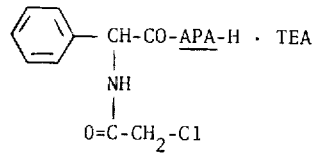

Trimethylsilyl chloride (40 mM) was added to a mixture of D-α-amino-benzylpenicillin triethylamine salt (40 mM) in dry methylene chloride (200 ml.) at 0°C. under an atmosphere of nitrogen. The mixture was stirred and cooled at 0°C. for 15 minutes and then triethylamine (40 mM) added all at once followed by chloroacetyl chloride (40 mM) dropwise at such a rate that the temperature does not rise above 5°C. The mixture was stirred at 0°C. for 1 hour and then brought to room temperature by removal of the cooling bath and stirred at room temperature for 3 hours. The mixture was concentrated under reduced pressure to about half-volume and ethyl acetate (200 ml.) and water (150 ml.) added. The pH was adjusted to 2.6, the layers mixed and the ethyl acetate layer separated, underlaid with water (150 ml.) and the pH brought to 7.8. The two phases were mixed together and the aqueous phase then separated and washed with ethyl acetate (3 × 100 ml.). The aqueous phase was overlaid with ethyl acetate (300 ml.), the pH again adjusted to 2.6 and the two phases mixed. The ethyl acetate phase was separated, washed with water (2 × 100 ml.), saline (2 × 75 ml.), and then dried (Na₂SO₄). The ethyl acetate solution was filtered and evaporated to dryness under reduced pressure. The residue was taken up in methylene chloride (50 ml.), triethylamine (40 mM) added and the mixture evaporated to dryness in vacuo to give 16 g. of product as its triethylamine salt. The infrared spectrum was consistent with that expected for the title product.

PREPARATION B

Repetition of the procedure of Preparation A but using the appropriate 6-[α-aminoarylacetamido]penicillanic acid or ester thereof and the appropriate chloroalkanoyl chloride Cl—CO—(CH₂)ₘ—CH(R₃)Cl as reactants affords the following compounds:

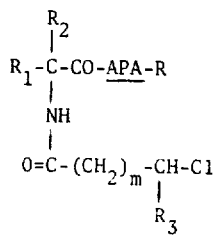

| $R_1$ | $R_2$ | m | $R_3$ | R |
|---|---|---|---|---|
| $C_6H_5$ | H | 0 | $CH_3$ | H |
| $C_6H_5$ | H | 1 | H | H |
| $C_6H_5$ | H | 1 | $CH_3$ | $CH_2OCOCH_3$ |
| 4—$ClC_6H_4$ | H | 0 | H | H |
| 3—$BrC_6H_4$ | H | 0 | $CH_3$ | $CH_2OCOC_6H_5$ |
| 3—$FC_6H_4$ | H | 0 | $CH_3$ | H |
| 2—$NO_2C_6H_4$ | H | 0 | H | H |
| 4—$CF_3C_6H_4$ | H | 0 | H | H |
| 2—$CH_3C_6H_4$ | H | 0 | H | $CH_2OCOCH(C_2H_5)_2$ |
| 4—t—$C_4H_9C_6H_4$ | H | 0 | H | H |
| 2—$HOC_6H_4$ | H | 0 | H | H |
| 3—$HOC_6H_4$ | H | 0 | H | $CH(CH_3)OCOCH_3$ |
| 4—$HOC_6H_4$ | H | 0 | $CH_3$ | H |
| 3—$CH_3C_6H_4$ | H | 0 | H | H |
| 2—$CH_3OC_6H_4$ | H | 0 | H | H |
| 4—n—$C_4H_9OC_6H_4$ | H | 0 | H | H |
| 4—$(C_2H_5)_2NC_6H_4$ | H | 0 | H | $CH_2OCOCH(CH_3)_2$ |
| 2—$(CH_3)_2NC_6H_4$ | H | 0 | H | H |
| 2—$CH_3CONHC_6H_4$ | H | 0 | H | H |
| 4—$H_2NSO_2C_6H_4$ | H | 0 | H | H |
| 4—$ClC_6H_4$ | H | 0 | $CH_3$ | H |
| 4—$ClC_6H_4$ | H | 0 | $CH_3$ | $CH_2OCO(-n-C_3H_7)$ |
| 2—$CH_3C_6H_4$ | H | 0 | $CH_3$ | H |
| 2—$CH_3OC_6H_4$ | H | 0 | $CH_3$ | H |
| 4—$H_2NSO_2C_6H_4$ | H | 0 | $CH_3$ | H |
| 4—$ClC_6H_4$ | H | 1 | H | $CH_2OCO(4—ClC_6H_4)$ |
| 4—t—$C_4H_9C_6H_4$ | H | 1 | $CH_3$ | H |
| 2—$CH_3OC_6H_4$ | H | 1 | $CH_3$ | $CH_2OCO(2—CH_3C_6H_4)$ |
| 4—n—$C_4H_9OC_6H_4$ | H | 1 | H | H |
| 4—$H_2NSO_2C_6H_4$ | H | 1 | H | H |
| 2—$(CH_3)_2NC_6H_4$ | H | 1 | H | H |
| 2—$CH_3CONHC_6H_4$ | H | 1 | $CH_3$ | H |
| 2—$NO_2C_6H_4$ | H | 1 | $CH_3$ | $CH_2OCO(4—CF_3C_6H_4)$ |
| 4—$HOC_6H_4$ | H | 1 | H | H |
| 2—$HOC_6H_4$ | H | 1 | $CH_3$ | H |
| $C_6H_5CH_2$ | H | 0 | $CH_3$ | H |
| $C_6H_5CH_2$ | H | 1 | H | H |
| i—$C_3H_7$ | H | 0 | $CH_3$ | $CH_2OCO(3—BrC_6H_4)$ |
| $C_3H_5$ | $CH_3$ | 1 | $CH_3$ | H |
| $C_5H_{11}$ | H | 0 | H | H |
| $C_5H_{11}$ | H | 1 | H | H |
| $C_6H_5$ | H | 0 | H | $CH_2OCOC(CH_3)_3$ |
| $C_6H_5$ | H | 1 | H | $CH_3OCOCH_3$ |
| $C_6H_5$ | H | 0 | $CH_3$ | $CH_2OCOC(CH_3)_3$ |
| $C_3H_5$ | $CH_3$ | 0 | H | $CH(C_2H_5)OCOCH_3$ |
| —$(CH_2)_5$— | | 0 | H | $CH_2OCO(2—CH_3OC_6H_4)$ |
| $C_5H_{11}$ | H | 0 | H | $CH_2OCOC(CH_3)_3$ |
| $C_6H_5CH_2CH_2$ | H | 0 | $CH_3$ | H |
| 1-naphthyl | H | 0 | H | H |
| 1-naphthyl | H | 1 | $CH_3$ | H |
| 1,4-cyclohexadienyl | H | 0 | H | H |
| 3-indolylmethyl | H | 0 | $CH_3$ | H |
| 3-indolylmethyl | H | 1 | H | $CH_2OCOC_2H_5$ |
| 2-thienyl | H | 0 | H | H |
| 3-thienyl | H | 1 | $CH_3$ | $CH_2OCOCH_3$ |
| 3-thienyl | H | 0 | H | H |
| 2-furyl | H | 0 | H | H |
| 2-furyl | H | 1 | $CH_3$ | H |
| $C_6H_5$ | $CH_3$ | 0 | H | H |
| $C_6H_5$ | $CH_3$ | 1 | H | $CH_2OCO(4—FC_6H_4)$ |
| $CH_3$ | $CH_3$ | 1 | H | $CH_2OCO(4—n—C_4H_9OC_6H_4)$ |
| $C_2H_5$ | $CH_3$ | 0 | $CH_3$ | H |
| $C_2H_5$ | $C_2H_5$ | 1 | H | H |
| n—$C_6H_{13}$ | H | 0 | H | H |
| —$CH_2$—$CH_2$— | | 0 | H | H |
| —$CH_2$—$CH_2$— | | 0 | $CH_3$ | H |
| —$CH_2$—$CH_2$— | | 1 | H | H |
| —$CH_2$—$CH_2$—$CH_2$— | | 0 | H | H |
| —$CH_2$—$CH_2$—$CH_2$— | | 1 | H | H |
| —$(CH_2)_5$— | | 0 | H | H |
| —$(CH_2)_5$— | | 1 | $CH_3$ | H |
| —$(CH_2)_8$— | | 0 | H | H |
| —$(CH_2)_8$— | | 0 | $CH_3$ | $CH_2OCOC(CH_3)_3$ |
| —$(CH_2)_8$— | | 1 | H | H |
| 2,4,6—$C_7H_7$* | H | 0 | H | H |
| 2,4,6—$C_7H_7$ | H | 1 | $CH_3$ | $CH_2OCOCH_3$ |

*2,4,6—$C_7H_7$ = 2,4,6-cycloheptatrienyl

PREPARATION C

General Procedure for α-Aminoacylpenicillin Acyloxyalkyl Esters

The procedure of Daehne et al., J. Med. Chem. 13, 612 (1970) is employed to prepare the title compounds. The procedure comprises acylating the appropriate acyloxyalkyl 6-aminopenicillanate with the appropriate amino acid chloride hydrochloride in a solvent such as methylene chloride in the presence of an acid acceptor ($NaHCO_3$). The ester, amino acid chloride hydrochloride and $NaHCO_3$ are reacted in a molar proportion of about 1.25:1.0:2.5 at 0°–10°C. for 2–3 hours. The mixture is filtered through diatomaceous earth, isopropanol added to the filtrate which is then concentrated in vacuo, Concentration is continued until the product separates. Isopropanol and ether are added to the mixture to complete precipitation of the product.

PREPARATION D

N-Carbamoylmethylthiourea

Anhydrous ammonia gas was bubbled into a stirred slurry of thiohydantoin (1.5 g.) in methanol (25 ml.) at 0°C. until the mixture was saturated. The mixture was then permitted to each room temperature and stirred overnight. It was evaporated to dryness under reduced pressure and the residual oil slurried in ether (25 ml.). Methanol (50 ml.) was added and the mixture swirled. The product, which crystallized, was recovered by filtration and dried in vacuo over phosphorous pentoxide; 750 mg., M.P. 145°–147°C.

PREPARATION E

N-Carboxymethylthiourea

2-Thiohydantoin (93.0 g., 0.80 M) was added to a solution of sodium hydroxide (72.0 g., 1.80 M) in water (600 ml.) and the mixture heated on a steam bath at 89°C. for 15 minutes. It is then cooled to 10°C. and concentrated hydrochloric acid (210 ml.) added while maintaining the temperature below 20°C. The slurry which formed was stirred for 1.5 hours at 5°–10°C. and then filtered. The filter cake was washed with water and dried overnight in vacuo over phosphorous pentoxide. It was recrystallized from methanol: 67.0 g.; M.P. 176°–179°C.

In like manner, 3-methyl-2-thiohydantoin (13.0 g.) was converted to N-methyl-N'-carboxymethylthiourea in 38.8% yield.

What is claimed is:

1. A compound of the formula

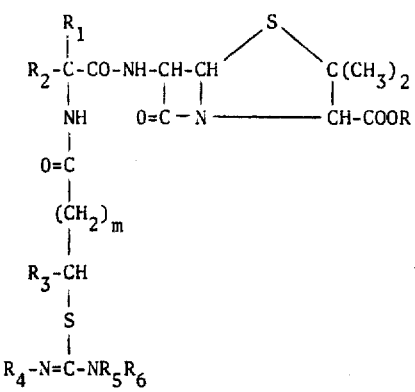

and the pharmaceutically-acceptable metal and amine salts thereof wherein

R is selected from the group consisting of hydrogen and acyloxy lower alkyl wherein acyloxy is selected from the group consisting of lower alkanoyloxy, benzoyloxy and substituted benzoyloxy wherein the substituent is selected from the group consisting of chloro, bromo, fluoro, lower alkyl, lower alkoxy and trifluoromethyl;

$R_1$ is selected from the group consisting of hydrogen, alkyl of from 1 to 6 carbon atoms, cycloalkyl of from 3 to 6 carbon atoms, 1,4-cyclohexadienyl, 2,4,6-cycloheptatrienyl, naphthyl, benzyl, phenethyl, indolylmethyl, furyl, thienyl and

wherein

Y is selected from the group consisting of hydrogen, nitro, di(lower alkyl)amino, lower alkanoylamino, lower alkyl, lower alkoxy, hydroxy, sulfamyl, chloro, bromo, fluoro, iodo and trifluoromethyl;

$R_2$ is selected from the group consisting of hydrogen and lower alkyl;

$R_1$ and $R_2$ when taken together with the carbon atom to which they are attached are cycloalkylidene of 3 to 10 carbon atoms;

$R_3$ is selected from the group consisting of hydrogen and methyl;

each of $R_5$ and $R_6$ is selected from the group consisting of hydrogen and lower alkyl;

$R_4$ is selected from the group consisting of hydrogen, lower alkyl, carboxymethyl, carbamoylmethyl and amidino;

$R_4$ and $R_5$ when taken together with the amidino group to which they are attached form a heterocyclic ring of the formula

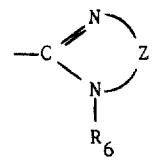

wherein

Z is selected from the group consisting of —N=CH—, alkylene of from 2 to 5 carbon atoms, -(O)—CH=CH— and —CH$_2$—C(O)—; and $m$ is 0 or 1.

2. A compound according to claim 1 wherein $R_1$ is phenyl; each of R, $R_2$, $R_3$ and $R_6$ is hydrogen; $R_4$ and $R_5$ together with the amidino group to which they are attached form a heterocyclic ring of the formula

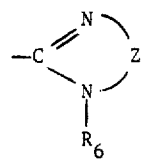

wherein Z is alkylene; and $m$ is 0.

3. A compound according to claim 1 wherein $R_1$ is phenyl; each of R, $R_2$, $R_3$ and $R_6$ is hydrogen; each of $R_4$ and $R_5$ is lower alkyl; and $m$ is 0.

4. A compound according to claim 1 wherein $R_1$ is phenyl; each of R, $R_2$, $R_3$ and $R_6$ is hydrogen; $R_4$ is amidino; $R_5$ is lower alkyl; and $m$ is 0.

5. A compound according to claim 1 wherein $R_1$ is phenyl; each of R, $R_2$, $R_3$ and $R_6$ is hydrogen, $R_4$ is carboxymethyl; and $m$ is 0.

6. A compound according to claim 1 wherein $R_1$ is 3-thienyl; each of $R_2$ and $R_6$ is hydrogen; each of $R_3$, $R_4$ and $R_5$ is methyl; $m$ is 0; and R is alkanoyloxy lower alkyl.

7. A compound according to claim 1 wherein $R_1$ is phenyl; each of R, $R_2$, $R_3$, $R_4$, $R_5$ and $R_6$ is hydrogen; and $m$ is 0.

8. A compound according to claim 1 wherein $m$ is 0; $R_1$ is phenyl; each of R, $R_2$, $R_3$ and $R_6$ is hydrogen; $R_4$ and $R_5$ together with the amidino group to which they are attached form a heterocyclic ring of the formula
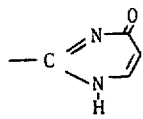
9. A compound according to claim 2 wherein Z is $-CH_2CH_2CH_2-$.
10. A compound according to claim 3 wherein each of $R_4$ and $R_5$ is methyl.
11. A compound according to claim 4 wherein $R_5$ is methyl.
12. A compound according to claim 6 wherein R is pivaloyloxymethyl.
* * * * *

UNITED STATES PATENT AND TRADEMARK OFFICE
CERTIFICATE OF CORRECTION

PATENT NO. : 3,891,627
DATED : June 24, 1975
INVENTOR(S) : Robert L. Rosati

It is certified that error appears in the above-identified patent and that said Letters Patent are hereby corrected as shown below:

Col. 3, lines 10 and 11, that portion of said lines reading "and 10 kylene" should read -- and 10 alkylene --;

line 17, "(1,3-diaza-1,7,5,6,7-" should read -- (1,3-diaza-1,4,5,6,7- --;

line 50, "deterioration are" should read -- deterioration and are --.

Columns 13 and 14, table bridging two columns at bottom of page, tenth items in columns marked "$R_3$" and "m" which read, respectively, "O" and "H" should read, respectively, -- H -- and -- O --.

Col. 14, line 7, third item in column marked "Y'" which reads "-C(N-n-$C_4H_9$NH(n-$C_4H_9$)" should read -- -C(N-n-$C_4H_9$)NH(n-$C_4H_9$) --.

Cols. 15 and 16, table bridging two columns, the sixth item in column marked "R" has been omitted and should read -- H --;

table bridging two columns, third entry from end of page in column marked "R" reading "$CH_2OCO(4-FC_6H_4/$" should read -- $CH_2OCO(4-FC_6H_4)$ --.

Col. 19, line 15, reading "]Penicillante" should read -- ]Penicillanate --.

Col. 20, Table III, the sixth entry under the heading "Y" should read -- -C[N($CH_3$)$_2$]N($CH_3$)$_2$ --;

UNITED STATES PATENT AND TRADEMARK OFFICE
CERTIFICATE OF CORRECTION

PATENT NO. : 3,891,627 (page 2)
DATED : June 24, 1975
INVENTOR(S) : Robert L. Rosati It is certified that error appears in the above-identified patent and that said Letters Patent are hereby corrected as shown below:

Col. 20, Table III, the eighth entry under the heading "Y" should read -- $-C[NC(NH)NH_2]NHCH_3$ --;

the thirteenth entry under the heading "Y" should read -- $-C=N-CH_2CH_2CH_2-NH$ --;

the eighteenth entry under the heading "$\delta$ NMR (ppm)*" reading "6.1(1H,d,J=6)" should read -- 6.1(1H,d,J=6Hz) --;

the nineteenth entry under the heading "$\delta$ NMR (ppm)*" reading "3H,d,J=6Hz)" should read -- 1.1 3H,d,J=6Hz) --;

the last entry under the heading "$\delta$ NMR (ppm)*" reading "2.9 3H,s)" should read -- 2.9(3H,s) --.

Col. 23, the Table in Preparation B, the twenty-seventh entry under the column marked "$R_3$" reading "3" should read -- $CH_3$ --;

the Table in Preparation B, the sixtieth entry under the column marked "R" reading "$CH_2OCO(4-FC_6H_4)$" should read -- $CH_2OCO(4-FC_6H_4)$ --.

Col. 26, line 35, reading "(O)-CH=CH-" should read -- C(O)-CH=CH- --.

Signed and Sealed this sixth Day of January 1976

[SEAL]

Attest:

RUTH C. MASON
*Attesting Officer*

C. MARSHALL DANN
*Commissioner of Patents and Trademarks*